United States Patent Office 3,829,409
Patented Aug. 13, 1974

3,829,409
BLOCK HOMOPOLYMERS OF 1,3-BUTADIENE AND
PROCESS FOR PREPARING THEM
Neidhart Sommer and Karl-Heinz Nordsiek, Marl, Germany, assignors to Chemische Werke Huls, A.G., Marl, Germany
No Drawing. Filed Nov. 27, 1972, Ser. No. 309,817
Claims priority, application Germany, Nov. 26, 1972,
P 21 58 575.1
Int. Cl. C08d 1/20, 3/06
U.S. Cl. 260—94.2 M                                12 Claims

ABSTRACT OF THE DISCLOSURE

Block homopolymers of 1,3-butadiene having a first block with nonuniform vinyl group distribution and a further block having a uniform vinyl group distribution in a mole ratio of 20:80 to 95:5 respectively and an average vinyl group content of 15–75%, preferably 20–50%, are prepared by adiabatic solvent polymerization at an ascending temperature in the presence of a catalyst system comprising an organolithium compound and a Lewis base. The polymers have improved processing properties.

BACKGROUND OF THE INVENTION

This invention relates to block homopolymers of 1,3-butadiene and to a process for preparing them.

It is conventional to polymerize butadiene in inert diluents with dilithium and organolithium catalysts. In this solvent polymerization method, polybutadienes are obtained generally having a vinyl group content of about 10%, independent of the polymerization temperature.

By the addition of a suitable Lewis base to the above process as a catalyst modifier, e.g., an ether, polybutadienes are obtained having a higher content of vinyl groups as shown by I. Kuntz, A. Gerber, J. Polym. Sci., 42: 299 (1960). Dutch Published Application 6809874 teaches that, depending on the particular type and amount of Lewis base added, any desired vinyl group content between 11% and 88% can be attained. In this connection, the magnitude of the vinyl group content is not dependent only on the particular Lewis base added and the amount thereof, but also on the polymerization temperature, since the vinyl group content decreases with an increasing temperature; see A. W. Langer, A. Chem. Soc. Div. Polymer Chem. Reprints, 7 (1): 132 (1966).

It is likewise known that the isothermal polymerization of 1,3-butadiene in the presence of a Lewis base, i.e., at a constant reaction temperature, produces polybutadienes having a constant uniform distribution of the vinyl groups, since the vinyl group content remains the same at a constant reaction temperature even with an increasing degree of conversion. In this connection, the constant distribution of vinyl groups relates to the uniform constitution of given segments of polymer molecule, while the total vinyl group content provides a quantitative value regarding the whole molecule. In contrast thereto, the adiabactic polymerization of 1,3-butadiene in the presence of a Lewis base, i.e., with a rising reaction temperature, in the temperature range between 30° and 155° C., produces polybutadienes having an irregular vinyl group distribution, since the vinyl group content decreases with an increasing degree of conversion at an increasing reaction temperature. Thus, in these polymers, the values for the vinyl group content represent only mean average values for the whole molecule, e.g., see German Unexamined Published Application 1,958,650.

Finally, it is known that, in the polymerization of 1,3-butadiene in the presence of a Lewis base, block polymers are obtained if either a Lewis base is added during the course of the polymerization, as in Belgian Pat. 717,-831, or if the polymerization is conducted in several stages, wherein the amount of Lewis base can be varied with each addition of diluent and butadiene, as in U.S. Pat. 3,140,278, the contents of which are incorporated by reference herein.

OBJECTS OF THE INVENTION

Accordingly, it is an object of this invention to provide an economical process for preparing block homopolymers of 1,3-butadiene wherein the blocks differ in stereoregularity.

Another object of this invention is to provide a process for regulating the vinyl group distribution and content in block homopolymers of 1,3-butadiene.

A further object of this invention is to provide an adiabatic process for polymerizing 1,3 - butadiene using a lithium catalyst and a Lewis base.

An additional object of this invention is to provide new block homopolymers of 1,3-butadiene and improved vulcanizates thereof.

Upon further study of the specification and appended claims, further objects and advantages of this invention will become apparent to those skilled in the art.

SUMMARY OF THE INVENTION

Briefly, the above and other objects are attained in one aspect of the present invention by providing a process for preparing block homopolymers of 1,3-butadiene consisting essentially of a first block having a nonuniform vinyl group distribution and a second block having a uniform vinyl group distribution, the weight ratio of the first block to the second block being 20:80 to 95:5 and the complete block homopolymer having a mean average vinyl group content of 15–75%, which comprises: (a) polymerizing 1,3-butadiene with a catalytic amount of a lithium catalyst and a catalyst-modifying amount of a Lewis base in an inert diluent at an initial polymerization temperature of 30–110° C. to 65–90% conversion to form a first block having a nonuniform vinyl group distribution therein; and (b) raising the polymerization temperature of the resultant reaction mixture 45–220° C. to a final polymerization temperature of 155–250° C. and polymerizing said 1,3-butadiene to 100% conversion based on the final product to form a second block having uniform vinyl group distribution therein.

In another aspect of this invention, novel butadiene block homopolymers and vulcanizates thereof are provided by the above process, which have improved elasticity and processing properties.

DETAILED DISCUSSION

It has now been found that block homopolymers of 1,3-butadiene can be produced in a simple manner, which block homopolymers consist of a block with a nonuniform vinyl group distribution and a further block with a uniform vinyl group distribution in a ratio of 20:80 to 95:5, respectively and which polymers exhibit a mean average total vinyl group content of 15–75%, preferably 20–50%, by conducting the polymerization at an ascending temperature in the presence of a catalyst system consisting essentially of an organolithium compound and a Lewis base in an inert diluent, by initiating the polymerization at temperatures of 30–110° C. and terminating same at temperatures of 155–250° C.

As used herein, the term "nonuniform vinyl group distribution" refers to a statistically random normal or Gaussian distribution of vinyl (i.e., 1,2-) linkages along the butadiene polymer chain in no statistically significant regularly alternating sequence.

The term "uniform vinyl group distribution" as used herein refers to a statistically significant regularly alternating distribution of vinyl (i.e., 1,2-) linkages along a segment of the butadiene polymer chain in a generally regularly alternating sequence within conventional limits of statistical significance; e.g., a uniform vinyl group distribution in a butadiene polymer chain having a vinyl group content of 10% means that on the mean average every tenth butadiene linkage is a 1,2- linkage, although statistically insignificant numbers of such linkages can be formed at, e.g., every ninth or eleventh butadiene linkage and lesser numbers of vinyl groups at other positions.

By "statistically significant" as used herein is meant a confidence level of 0.95.

It will be appreciated by those skilled in the art that, while the organolithium catalysts represent a preferred embodiment of this invention, metallic lithium catalyst preparations can also be used in accordance with this invention. The products obtained with metallic lithium will comprise a central block having nonuniform vinyl group distribution and a terminal block having uniform vinyl group distribution at both ends thereof, rather than at one end thereof as is the case when using an organolithium catalyst due to the known manner in which metallic lithium catalyzes the polymerization of butadiene at two active sites rather than the single active site characteristic of organolithium catalysts.

In polymers prepared according to this invention with metallic lithium catalysts, the ratio of the nonuniform vinyl group block to the pair of uniform vinyl group blocks is preferably the same as in the polymers prepared with organolithium catalysts.

Many suitable organolithium compounds are known in the art; these include but are not limited to methyllithium, ethyllithium, n-, sec.-, tert.-butyllithium, amyllithium, phenyllithium, cyclohexyllithium, etc. The organolithium compounds are employed in catalytic amounts, generally 0.01–0.1% by weight, preferably 0.02–0.05% by weight, based on the butadiene monomer. Many suitable Lewis bases are also known in the art; these include but are not limited to ethers, e.g., diethyl ether, di-n-propyl ether, diisopropyl ether, di-n-butyl ether, tetrahydrofuran, dioxane, ethylene glycol dimethyl ether, diethylene glycol dimethyl ether, diethylene glycol diethyl ether, triethylene glycol dimethyl ether, tetraethylene glycol dimethyl ether; tertiary amines, e.g., trimethylamine, triethylamine, N,N,N',N' - tetramethylethylenediamine, N-methylmorpholine, N-ethylmorpholine, N-phenylmorpholine– orthoesters, e.g., triethyl-orthoformic-ester; ketales, e.g., 1.3-dioxolane, 2.2-dimethyl - 1.3 - dioxolane; phosphoric-compounds, e.g., hexamethyl-phosphoric-acid-triamide.

The Lewis bases can be employed alone or in admixture and are used in a catalyst-modifying amount, generally 0.01–10.0% by weight, preferably 0.05–5% by weight, based on the butadiene monomer. The weight ratio of the Lewis base to the organolithium compound in the catalyst system is generally 0.1:1 to 1000:1, preferably 1:1 to 250:1.

The solvent polymerization takes place in inert organic diluents, in which the monomer, organolithium catalyst and Lewis base are soluble. Many suitable inert diluents are known in the art and generally preferred are alkanes, cycloalkanes, arenes, or alkarenes. Suitable diluents include but are not limited to ethane, propane, iso- and n-butane, iso- and n-pentane, iso- and n-hexane, iso- and n-heptane, iso- and n-octane, cyclobutane, cyclopentane, cyclohexane, cycloheptane, cyclooctane, benzene, toluene, o-, m-, and p-xylene, or ethylbenzene; preferred diluents are iso- and n-butane, iso- and n-pentane, iso- and n-hexane, iso- and n-heptane. The diluents can be employed either alone or in admixture, e.g., as a hydrocarbon distillate fraction.

According to the present invention, the polymerization of 1,3-butadiene in the aforementioned system is effected adiabatically, i.e., at an increasing temperature during the course of the reaction.

For the adiabatic polymerization of 1,3-butadiene, two temperature values are characteristic, i.e., the starting temperature of 30–110° C. at which the polymerization is initiated, and the final temperature of 155–250° C. at which the polymerization is terminated. The differential between the starting and final temperatures is thus 45–220° C., generally 65–185° C. and preferably 85–145° C. As used in this connection, the term adiabatic polymerization means that heat is neither supplied nor removed during the course of polymerization.

The temperature increase occurring during the adiabatic polymerization is caused by the heat liberated during the polymerization of butadiene; the magnitude of this temperature in a given reaction is a function of the specific heat of the diluent and the ratio of diluent to butadiene when other variables are kept constant.

Generally, based on an assumed conversion of 100% in the polymer product, temperatures are maintained at the initial temperature range until 20–95%, generally 40–90%, preferably 65–90% conversion is reached, and the temperature then increased to termination temperatures for the remainder of the polymerization reaction. Polymerization is carried out to produce a final product having a number average molecular weight as determined by scattering of light (cf. Molekulargewichtsbestimmung an makromolekularen Stoffen; G. V. Schulz, H. J. Cantow, G. Meyerhoff, Houben-Weyl, G. Thieme Verlag Stuttgart, Band 3/1, S. 377–445, 1955), $7 \times 10^4$ to $8.0 \times 10^5$, preferably $1.5 \times 10^5$ to $5.5 \times 10^5$.

As is known, the polymerization of butadiene catalyzed by organolithium compounds at temperatures of below 90° C. forms linear, unbranched polybutadienes having relatively poor processing characteristics. One determinative factor in this connection are the low Defo elasticity values of such products. In polymerization at above 90° C., long-chain, branched products are obtained, as described in detail in British Pat. 1,143,690, the contents of which are incorporated by reference herein. These branched polybutadienes are distinguished by considerably better processing properties; the defo elasticity values are correspondingly high, e.g., 25–50, preferably 30–45.

The polybutadienes producible according to the process of this invention exhibit, depending on the polymerization temperature, an analogous property spectrum; with polymerization temperatures of above 90° C., a considerable rise in the defo elasticity values takes place (see Table 3), concomitantly with considerably better processing characteristics, especially in extrusion of the products.

The increased Defo-elasticity values are based upon the achieved long-chain-branching. Higher long-chain-branchings conduct to higher chain entanglements of the molecules (physical pre-crosslinking). As a result thereof the pressure in front of the extrusion-exit increases yielding in a quicker and more economic production output.

The polymerization of this invention can conveniently be conducted under the autogenous pressure of the reaction solution. However, it is also possible to employ any desired higher pressure, adjusted by means of an inert gas, e.g., nitrogen or argon. The pressure must, of course, be sufficiently high to maintain the diluent in the liquid phase under the polymerization temperatures employed.

The polymerization can be effected discontinuously as well as continuously. In this connection, it is to be noted that organolithium catalyst poisons, i.e., all substances which would destroy the catalyst, e.g., water, alcohols, carbon dioxide and oxygen, must be substantially excluded, as is known in the art. After the polymerization is terminated, one of the stabilizers customary for polybutadienes is added to the polymer solution.

The polybutadienes obtained according to the process of this invention are characterized by a block structure consisting of a first block having a nonuniform vinyl group distribution and a further block having a uniform vinyl group distribution. In particular, they are characterized by a ratio of the nonuniform block to the uniform block of 20:80 to 95:5, preferably 40:60 to 90:10, respectively and by mean average content of vinyl groups of 15–75%, preferably 20–50%.

It was surprising and could not be foreseen that, by the controlled temperature variation during the polymerization, the distribution of the vinyl groups within each macromolecule can be easily varied in a predetermined manner.

As compared to the conventional prior art processes previously set forth which result in block homopolymers of butadiene, adiabatic polymerization in accordance with this invention can be conducted in an especially simple and economical manner. Furthermore, the process of this invention permits the production of polybutadiene block structures without directly interfering with the polymerization system, which is of great importance in view of the fact that the polymerization catalyzed by organolithium compounds is known to be highly sensitive to catalyst poisons.

Moreover, the process of this invention offers the possibility of producing, at temperatures above 90° C., polybutadienes wherein two advantageous properties are paired and tailored with each other: a block arrangement with a nonuniform and a uniform distribution of the vinyl groups, and a long-chain branching structure in that portion of the molecule polymerized at temperatures above 90° C. The polybutadienes producible in accordance with the process of this invention have rubber-elastic properties; they represent, due to the above-described characteristics, a novel material excellently suited as a starting substance for vulcanizates. They can be vulcanized directly in accordance with conventional methods, or they can be extended, e.g., with aliphatic or aromatic oils and/or filled, e.g., with carbon black and then vulcanized.

Those polybutadienes are preferred as raw materials for tire production. Their characteristics make them best suited as basic elastomeric material for tire treads of passenger cars.

Commonly used SBR and BR-blends can be replaced advantageously by those polybutadienes having a total vinyl group content of 30 to 45%.

Such homopolybutadienes are more profitable than said commonly used blends as regards to superior homogeneous distribution of fillers and vulcanization ingredients.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the following Examples, test data were obtained according to the following standardized test methods:

(a) Vinyl group content by infrared spectroscopy according to P. Simak, G. Fahrbach, Angewandte Makromolekulare Chemie, 12 (1970), 73–78.

(b) Relative solution viscosity (RSV): Schulz et al., op. cit.

(c) Mooney viscosity (ML–4): DIN 53523.

(d) Defo hardness and elasticity: DIN 53514.

(e) Molecular weight distribution: gel permeation chromatography (GPC-method).

(f) Bound rubber: treatment in benzene for 30 hours at 20° C.; centrifugated residue minus carbon black content.

(g) Carbon absorption time of the raw rubber: time until max. energy uptake of the internal mixer.

(h) Tensile strength: DIN 53504.

(i) Elongation at break: DIN 53504.

(j) Modulus 300%: DIN 53504.

(k) Hardness degree Shore: DIN 53505.

(l) Elasticity: DIN 53512.

(m) DIN abrasion: DIN 53516.

(n) Compression set: DIN 53517.

EXPERIMENTS 1–14 (COMPARATIVE EXPERIMENTS)

In order to prove the effect of the temperature under which the process is conducted on the vinyl group content, the polymerization process is observed at a constant reaction temperature and compared to an otherwise similar process observed at an increasing reaction temperature.

An autoclave of 2 liter capacity is charged, with careful exclusion of air and moisture, with a total of 0.8 kg. of diluent, 1-3,butadiene and a Lewis base as shown in Table 4. The reaction solution is heated to the desired initial polymerization temperature, and the organolithium compound is then added thereto. After termination of the reaction, 0.5% by weight of di - tert. - butyl - p - cresol ("Ionol"), based on butadiene, is added, and the reaction mixture is worked up by steam stripping the diluent. After drying the properties of the polymers are determined.

The results compiled in Table 1 show that the vinyl group content obtained with a relatively constant polymerization temperature, i.e., with an isothermal course of reaction, and with the same given amount of a Lewis base decreases as the temperature is increased until it reaches a mimimum value of 10% at 155° C. Above this temperature limit, the vinyl group content remains unchanged. Accordingly, for the adiabatic polymerization of 1,3-butadiene in the presence of Lewis bases, polybutadienes are obtained in the temperature range of 30–155° C., having a nonuniform vinyl group distribution. In contrast thereto, at temperatures above 155° C., polybutadienes are produced having a regular distribution of vinyl groups, since the content of vinyl groups in this case assumes a constant value of 10%, independent of the amount of the given Lewis base and the polymerization temperature.

EXPERIMENTS 15–19, EXPERIMENTS 20–24 (COMPARATIVE EXPERIMENTS)

By conducting the adiabatic polymerization of 1,3-butadiene in the presence of Lewis bases initially in the temperature range of 30–155° C. and subsequently at a temperature above 155° C., polybutadienes are obtained having one nonuniform block and one uniform block. Examples of such polybutadienes are shown in Table 2.

An autoclave having a 280 liter capacity is charged, with careful exclusion of air and moisture, with a total of 130 kg. of diluent, 1,3-butadiene, and a Lewis base as shown in Table 4. The reaction solution is heated to the initial temperature $T_A$, and the organolithium compound is then added thereto. After termination of the reaction, i.e., after the pressure and temperature peaks have respectively subsided, the reaction mixture is cooled. 0.5% by weight of di-tert.-butyl-p-cresol ("Ionol"), based on butadiene, is then added, and the mixture worked up by stream stripping the diluent. After drying, the properties of the polymers are determined.

The reaction conditions of Experiments 1–24 are compiled in Table 4, and the analytical data of the thus-obtained polymers are set forth in Tables 3 and 5.

TABLE 1

| Experiment number | Polym. temp., °C. | Lewis base [a] | n-Butyllithium [b] | RSV [c] | Content of vinyl groups, percent |
|---|---|---|---|---|---|
| 1 | 45 | 0.05 | 0.045 | 1.1 | 49 |
| 2 | 70 | 0.05 | 0.045 | 0.9 | 42 |
| 3 | 105 | 0.05 | 0.045 | 1.2 | 28 |
| 4 | 140 | 0.05 | 0.045 | 1.4 | 13 |
| 5 | 155 | 0.05 | 0.045 | 1.8 | 10 |
| 6 | 170 | 0.05 | 0.045 | 1.5 | 10 |
| 7 | 190 | 0.05 | 0.045 | 1.6 | 10 |
| 8 | 45 | 0.1 | 0.045 | 0.9 | 66 |
| 9 | 70 | 0.1 | 0.045 | 1.1 | 56 |
| 10 | 105 | 0.1 | 0.045 | 1.2 | 39 |
| 11 | 140 | 0.1 | 0.045 | 1.1 | 16 |
| 12 | 155 | 0.1 | 0.045 | 1.4 | 10 |
| 13 | 170 | 0.1 | 0.045 | 1.6 | 10 |
| 14 | 190 | 0.1 | 0.045 | 1.5 | 10 |

[a] Ethylene glycol dimethyl ether, percent by weight, based on butadiene.
[b] Active catalyst, percent by weight, based on butadiene.
[c] Solution in toluene (0.2%) at 25° C.

TABLE 2

| Experiment number | Polym. temp., °C | Weight ratio, hexane:butadiene | Conversion, percent | Nonuniform block Parts by weight, percent | Nonuniform block Vinyl group content (mean value) percent | Uniform block Parts by weight, percent | Uniform block Vinyl group content, percent | Lewis base a | n-Butyl-lithium b | ML-4, 100° C. | Total molecule vinyl group content (mean value), percent |
|---|---|---|---|---|---|---|---|---|---|---|---|
| 15 | 70 T_A / 155 T_F | 80:20 | 0 / 100 | | | | | 0.05 | 0.029 | 80 | 26 |
| 16 | 70 T_A / 155 T_F | 80:20 | 0 / 100 | | | | | 0.1 | 0.029 | 79 | 33 |
| 17 | 71 T_A / 155 T_F | 80:20 | 0 / 100 | | | | | 0.2 | 0.031 | 85 | 40 |
| 18 | 58 T_A / 155 T_F | 78:22 | 0 / 100 | | | | | 0.05 | 0.032 | 81 | 31 |
| 19 | 60 T_A / 155 T_F | 78:22 | 0 / 100 | | | | | 0.1 | 0.04 | 41 | 37 |
| 20 | 70 T_A / 155 / 166 T_F | 78:22 | 0 / 87 / 100 | 87 | 26 | 13 | 10 | 0.05 | 0.029 | 95 | 25 |
| 21 | 70 T_A / 155 / 166 T_F | 78:22 | 0 / 87 / 100 | 87 | 33 | 13 | 10 | 0.1 | 0.029 | 100 | 30 |
| 22 | 71 T_A / 155 / 179 T_F | 75:25 | 0 / 76 / 100 | 76 | 40 | 24 | 10 | 0.2 | 0 031 | 101 | 33 |
| 23 | 58 T_A / 155 / 188 T_F | 72:28 | 0 / 71 / 100 | 71 | 31 | 29 | 10 | 0.05 | 0.032 | 105 | 25 |
| 24 | 60 T_A / 155 / 195 T_F | 70:30 | 0 / 67 / 100 | 67 | 37 | 33 | 10 | 0.1 | 0.04 | 54 | 28 | a Ethylene glycol dimethyl ether, percent by weight, based on butadiene monomer feed.
b Active catalyst, percent by weight, based on butadiene monomer feed.

NOTE.—$T_A$=initial polymerization temperature; $T_F$=final polymerization temperature.

TABLE 3

| Experiment number | Polym. temp., °C | Vinyl group content (average value), percent | ML-4, 100° C. | Defo elasticity at 80° C. |
|---|---|---|---|---|
| 21 | 70-166 | 30 | 100 | 37 |
| 22 | 71-179 | 33 | 101 | 40 |
| 23 | 58-188 | 25 | 105 | 42 |

Experiments 15–19 are comparative tests conducted in a temperature range of 30–155° C. The thus-obtained polymers have a nonuniform distribution of vinyl groups. Experiments 20–24 were initiated at a temperature of 30–155° C. and terminated at a temperature above 155° C. The block homopolymers of butadiene thus-obtained in accordance with the invention have a first block with a nonuniform vinyl group distribution and a further block with a uniform vinyl group distribution.

The weight ratio of nonuniform to uniform blocks can be seen from Table 2, columns 5 and 7. This weight ratio is obtained from the conversions obtained from the beginning of each polymerization (initial temperature) up to 155° C., and from 155° C. to the end of each polymerization (final temperature).

The two polymerization stages of this invention are conducted at temperatures of 30–250° C., preferably 40–215° C. The polymerization is initiated at starting temperatures of 30–110° C., preferably below 90° C., and terminated at temperatures of 155–250° C., preferably 155–215° C.

TABLE 4.—REACTION CONDITIONS

| Experiment number | Weight ratio, hexane:butadiene | Lewis base a | n-Butyl-lithium b | Polymerization temp., °C | Initial value $T_A$ °C | Final value °C | Reaction time, minutes |
|---|---|---|---|---|---|---|---|
| 1 | 98:2 | 0.05 | 0.045 | 45 | | | 240 |
| 2 | 98:2 | 0.05 | 0.045 | 70 | | | 30 |
| 3 | 98:2 | 0.05 | 0.045 | 105 | | | <10 |
| 4 | 98:2 | 0.05 | 0.045 | 140 | | | <10 |
| 5 | 98:2 | 0.05 | 0.045 | 155 | | | <10 |
| 6 | 98:2 | 0.05 | 0.045 | 170 | | | <10 |
| 7 | 98:2 | 0.05 | 0.045 | 190 | | | <10 |
| 8 | 98:2 | 0.1 | 0.045 | 45 | | | 240 |
| 9 | 98:2 | 0.1 | 0.045 | 70 | | | 30 |
| 10 | 98:2 | 0.1 | 0.045 | 105 | | | <10 |
| 11 | 98:2 | 0.1 | 0.045 | 140 | | | <10 |
| 12 | 98:2 | 0.1 | 0.045 | 155 | | | <10 |
| 13 | 98:2 | 0.1 | 0.045 | 170 | | | <10 |
| 14 | 98:2 | 0.1 | 0.045 | 190 | | | <10 |
| 15 | 80:20 | 0.05 | 0.029 | | 70 | 155 | 5 |
| 16 | 80:20 | 0.1 | 0.029 | | 70 | 155 | 5 |
| 17 | 80:20 | 0.2 | 0.031 | | 71 | 155 | 5 |
| 18 | 78:22 | 0.05 | 0.032 | | 58 | 155 | 6 |
| 19 | 78:22 | 0.1 | 0.04 | | 60 | 155 | 6 |
| 20 | 78:22 | 0.05 | 0.029 | | 70 | 166 | 5 |
| 21 | 78:22 | 0.1 | 0.029 | | 70 | 166 | 5 |
| 22 | 75:25 | 0.2 | 0.031 | | 71 | 179 | 5 |
| 23 | 72:28 | 0.05 | 0.032 | | 58 | 188 | 5 |
| 24 | 70:30 | 0.1 | 0.04 | | 60 | 195 | 5 | a Ethylene glycol dimethyl ether, percent by weight, based on butadiene.
b Active catalyst, percent by weight, based on butadiene.

TABLE 5.—ANALYTICAL DATA OF THE POLYMERS

| Experiment No. | ML-4, 100° C. | RSV[a] | Gel, percent | $D_H/D_E$[b] | Content of— | | |
|---|---|---|---|---|---|---|---|
| | | | | | Trans-groups | Cis-groups | Vinyl groups[c] |
| 1 | | 1.1 | <2 | | 36 | 15 | 49 |
| 2 | | 0.9 | <2 | | 37 | 21 | 42 |
| 3 | | 1.2 | <2 | | 44 | 28 | 28 |
| 4 | | 1.4 | <2 | | 53 | 34 | 13 |
| 5 | | 1.8 | <2 | | 51 | 39 | 10 |
| 6 | | 1.5 | <2 | | 51 | 39 | 10 |
| 7 | | 1.6 | <2 | | 51 | 39 | 10 |
| 8 | | 0.9 | <2 | | 20 | 14 | 66 |
| 9 | | 1.1 | <2 | | 29 | 15 | 56 |
| 10 | | 1.2 | <2 | | 42 | 19 | 39 |
| 11 | | 1.1 | <2 | | 55 | 29 | 16 |
| 12 | | 1.4 | <2 | | 51 | 39 | 10 |
| 13 | | 1.6 | <2 | | 51 | 39 | 10 |
| 14 | | 1.5 | <2 | | 51 | 39 | 10 |
| 15 | 80 | 3.1 | <2 | | 46 | 28 | 26 |
| 16 | 79 | 3.1 | <2 | | 41 | 26 | 33 |
| 17 | 85 | 3.2 | <2 | | 37 | 23 | 40 |
| 18 | 81 | 3.1 | <2 | | 48 | 21 | 31 |
| 19 | 41 | 2.5 | <2 | | 43 | 20 | 37 |
| 20 | 95 | 3.4 | <2 | 1,100/37 | 51 | 25 | 24 |
| 21 | 100 | 3.5 | <2 | 1,225/37 | 42 | 28 | 30 |
| 22 | 101 | 3.5 | <2 | 1,200/40 | 41 | 26 | 33 |
| 23 | 105 | 3.6 | <2 | 1,275/42 | 52 | 23 | 25 |
| 24 | 54 | 2.8 | <2 | 800/34 | 41 | 31 | 28 |

[a] A 0.2% solution in toluene at 25° C.
[b] Defo hardness and defo elasticity at 80° C.
[c] IR spectroscopy, 2.5% solution in carbon disulfide.

Comparative Experiments 1–14 demonstrate that the vinyl group content obtained in an isothermal reaction with a constant amount of Lewis base (Nos. 1–7 and 8–14) decreases toward higher temperatures and reaches a value of 10% at about 155° C. Above this temperature, the vinyl group content remains unchanged. This means, for the content of vinyl groups and for the distribution of the vinyl groups with an adiabatic polymerization reaction:

(1) At temperatures of below and up to 155° C., polybutadienes are obtained having a nonuniform distribution of the vinyl groups (Comparative Examples 15–19). Accordingly, for such polybutadienes, the vinyl group content (Table 5, column 8) is a mean average value.

(2) At temperatures of above 155° C., polybutadienes are obtained having a content of vinyl groups of 10% and a uniform distribution of the vinyl groups.

(3) By initiating the adiabatic polymerization at below 155° C. and terminating the reaction at above 155° C., polybutadienes are produced having a homopolymer block structure. These polymers have a block with a nonuniform vinyl group distribution and a further block with a uniform vinyl group distribution (Experiments 20–24). For example, in Experiment No. 20, the average vinyl group content for the nonuniform block corresponds to that of Comparative Example 15 (entirely analogous reaction conditions up to 155° C.). Corresponding remarks apply with respect to the pairs of experiments 21/16; 22/17; 23/18; and 24/19.

The weight ratio of the blocks with respect to one another is determined by the conversions obtained from the beginning of each polymerization up to 155° C., and from 155° C. to the end of each polymerization (Table 2, columns 5 and 7).

For Examples 20–24, the vinyl group content for the uniform block is calculated to be respectively 10% (Table 2, column 8), from the known weight proportions of the blocks (Table 2, columns 5 and 7), the known average content of vinyl groups for the nonuniform block (Table 2, column 6), and the known average content of vinyl groups for the total molecule (Table 5, column 8), in accordance with the formula $$A = B - \frac{100 (B-C)}{D}$$

wherein

A = content of vinyl groups, uniform block, in percent
B = average content of vinyl groups, nonuniform block, in percent
C = average content of vinyl groups, total molecule, in percent
D = weight proportion, uniform block, in percent.

This finding is in full conformance with the results from Comparative Examples 1–14.

The long-chain branching occurring at polymerization temperatures of above 90° C. and the accompanying higher Defo elasticity values can be seen from the corresponding data of Examples 21–23 (Table 5, column 5). With increasingly higher final temperatures, the Defo elasticity values are correspondingly higher.

EXPERIMENTS 25 AND 26 (COMPARATIVE EXPERIMENTS)

The superiority of the vulcanizates of the block homopolymers of butadiene obtained according to the process of this invention over those of the conventional polybutadiene block structure is proven in Experiments 25 and 26. Experiments 25 and 26 are based in each case on three respectively rubbers designated A, B and C.

Rubber A represents a blend of two butadiene homopolymers in a weight ratio of 33:67, wherein the first component has a vinyl group content of 10%, and the second component a vinyl group content of 37%.

The second polybutadiene component having a high vinyl group content was prepared according to U.S. Pat. 3,301,840.

Rubber B is a butadiene block polymer with two uniformly constructed blocks, wherein the former has a vinyl group content of 10% and the latter a vinyl group content of 37%. The weight ratio of both blocks, as in the blend, is 33:67. This rubber is produced according to the disclosure of Belgian Pat. 717,831.

Rubber C represents a butadiene block polymer with a uniformly constructed block, the content of vinyl groups of which is 10%, as well as a block with a nonuniform arrangement of the monomer units introduced in the 1,2-position; the average vinyl group content of the latter is 37%. The weight ratio of the two blocks is 33:67. The manufacture and properties of this type of rubber correspond to the data of Experiment 24 in Tables 2, 4, and 5.

Vulcanizates were prepared and tested using the following two recipes I and II:

Experiment No. 25
Recipe I:

| | Parts |
|---|---|
| Rubber | 100 |
| Stearic acid | 2 |
| ZnO | 3 |
| HAF (high abrasion furnace) carbon black | 50 |
| Highly aromatic plasticizer oil | 8 |
| Phenyl-β-naphthylamine | 1 |
| Sulfur | 1.5 |
| "Vulkacit" CZ [1] | 0.9 | absorption period, the extrusion behavior, as well as the mixture viscosity according to Mooney, are clearly superior in rubber C produced in accordance with the present invention.

TABLE 6.—PROPERTIES OF THE CRUDE RUBBERS

| Rubber | Content of vinyl groups (average value) | Crude Mooney viscosity | Crude Defo, 80° C.* | Molecular weight distribution ** |
|---|---|---|---|---|
| A | 28 | 57 | 700/17 | Narrow. |
| B | 28 | 53 | 740/15 | Do. |
| C | 28 | 54 | 800/34 | Broad. |

*DIN 53-514.   **GPC-method.

TABLE 7.—VULCANIZATE PROPERTIES

| Experiment number | Rubber | Carbon absorption time (min.) | Mixture ML-4 | Mixture Defo | Bound-rubber, percent | Extrusion behavior Screw 6d; 80 r.p.m., head temp. 100° C., cyl. temp. 70° C. | | |
|---|---|---|---|---|---|---|---|---|
| 22 | A | 3.3 | 98 | 1,700/15 | 14 | 184 g./min. | 109 m./min. | |
|  | B | 3.2 | 89 | 1,600/15 | 17 | 217 g./min. | 107 m./min. | |
|  | A | 2.8 | 71 | 1,800/20 | 19.2 | 347 g./min. | 185 m./min. | |
| 23 | A | 1.3 | 71 | 1,200/10 | 16 | 296 g./min. | 196 m./min. | |
|  | B | 1.2 | 66 | 1,050/9 | 15.7 | 298 g./min. | 195 m./min. | |
|  | C | 0.9 | 48 | 1,125/13 | 17.5 | 370 g./min. | 219 m./min. | |

TABLE 8

| Experiment No. | Vulc. time, 143° C. | Strength, kg./cm.² | Elongation, percent | Modulus, 300% | Hardness, degrees Shore | Elasticity, percent 20° C. | Elasticity, percent 75° C. | Spec. gravity | DIN, abrasion | Compr. set, 22 h./70° C. |
|---|---|---|---|---|---|---|---|---|---|---|
| 23A | 15' | 25 | 540 | 16 | 47 | 32 | 48 | | | |
|  | 30' | 105 | 342 | 88 | 64 | 48 | 54 | | | |
|  | 60' | 106 | 322 | 90 | 64 | 49 | 52 | 1.10 | 104 | 18 |
|  | 120' | 109 | 346 | 90 | 63 | 47 | 51 | | | |
| 23B | 15' | 32 | 616 | 16 | 45 | 29 | 45 | | | |
|  | 30' | 122 | 406 | 80 | 62 | 49 | 51 | | | |
|  | 60' | 119 | 372 | 83 | 63 | 47 | 51 | 1.10 | 108 | 19 |
|  | 120' | 123 | 392 | 83 | 62 | 46 | 51 | | | |
| 23C | 15' | 12 | 450 | 9 | 40 | 29 | 45 | | | |
|  | 30' | 125 | 416 | 78 | 61 | 49 | 50 | | | |
|  | 60' | 135 | 394 | 89 | 62 | 48 | 51 | 1.10 | 110 | 20 |
|  | 120' | 132 | 394 | 87 | 61 | 47 | 51 | | | |
| 24A | 15' | 49 | 542 | 24 | 50 | 40 | 38 | | | |
|  | 30' | 125 | 392 | 91 | 63 | 43 | 50 | | | |
|  | 60' | 128 | 358 | 92 | 63 | 44 | 50 | 1.13 | 126 | 17 |
|  | 120' | 116 | 382 | 93 | 62 | 44 | 49 | | | |
| 24B | 15' | 90 | 542 | 42 | 55 | 39 | 41 | | | |
|  | 30' | 115 | 378 | 86 | 62 | 41 | 46 | | | |
|  | 60' | 115 | 364 | 89 | 62 | 41 | 47 | 1.13 | 129 | 18 |
|  | 120' | 116 | 372 | 87 | 62 | 41 | 46 | | | |
| 24C | 15' | 32 | 542 | 19 | 45 | 36 | 29 | | | |
|  | 30' | 125 | 440 | 79 | 60 | 42 | 46 | | | |
|  | 60' | 118 | 380 | 89 | 61 | 42 | 47 | 1.13 | 128 | 18 |
|  | 120' | 125 | 402 | 88 | 60 | 41 | 46 | | | |

Experiment No. 26
Recipe II:

| | Parts |
|---|---|
| Rubber | 100 |
| Stearic acid | 2.5 |
| ZnO | 4 |
| HAF carbon black | 70 |
| Highly aromatic plasticizer oil | 40 |
| Phenyl-β-naphthylamine | 1 |
| Sulfur | 2.2 |
| "Vulkacit" CZ [1] | 1.2 |

[1] N-cyclohexylbenzothiazole sulfenamide.

The mixture was prepared in a GK-2 masticator using a front rotor speed of 40 r.p.m. and a jacket temperature of 50° C. The sulfur and the "Vulkacit" CZ were added in a second operating step on a rolling mill at 50° C. The results of the experiments are presented in Table 7. The properties of the crude polymers are compiled in Table 6.

The advantageous behavior of the polymers of this invention according to rubber C as compared to the comparison products A and B can clearly be seen from Tables 6 thru 8. Especially characteristic for rubber C are the broader molecular weight distribution, as well as a higher degree of long-chain branchings, measured by the higher values for the defo elasticity.

As compared to the state of the art rubbers A and B, higher values result for the plasticity according to the defo method, with the Mooney viscosity remaining the same. The processing properties, measured by the carbon black The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A solvent polymerization process for preparing block homopolymers of 1,3-butadiene having a number average molecular weight of about $7 \times 10^4$ to $8 \times 10^5$ and consisting essentially of a first block having a non-uniform vinyl group distribution and a second block having a uniform vinyl group distribution, the weight ratio of said first block to said second block being 40:60 to 90:10 and the complete block homopolymer having a mean average vinyl group content of 20–50%, which comprises:

(a) initiating solvent homopolymerization of 1,3-butadiene with about 0.01–0.1% by weight of a lithium catalyst and a catalyst-modifying amount of an ether or a tertiary amine in an inert diluent at an initial polymerization temperature of 30–110° C.;

(b) adiabatically polymerizing said butadiene over an increasing temperature differential of 45–125° C. within a temperature range of 30–155° C. to 40–90% conversion based on the final product, to form a first block having a non-uniform, random vinyl group distribution therein; and (c) polymerizing said 1,3-butadiene to 100% conversion based on the final product at a temperature of 155–200° C. to form a second block having a uniformly distributed and regularly alternating vinyl group content of about 10%.

2. A process according to Claim 1 wherein said lithium catalyst is an organolithium catalyst.

3. A process according to Claim 1, wherein the catalyst-modifying amount of said ether or tertiary amine is 0.05–5% by weight, based on the butadiene monomer.

4. A process according to Claim 1 wherein the final polymerization temperature is 85–180° C. higher than the initial polymerization temperature.

5. A process according to Claim 1 wherein: (a) said lithium catalyst is an organolithium catalyst; (b) said initial polymerization temperature is below 90° C.; and (c) said final polymerization temperature is 155–215° C. and from 65–185° C. higher than the initial polymerization temperature.

6. A process according to Claim 1, wherein the temperature differential between steps (a) and (c) is 65–185° C.

7. A process according to Claim 1, wherein step (b) is carried out to 65–90% conversion.

8. A block homopolymer of 1,3-butadiene prepared according to the process of Claim 1 consisting essentially of a first block having a nonuniform vinyl group distribution and a second block having a uniform vinyl group distribution, the weight ratio of said first block to said second block being 40:60 to 90:10 and the complete block homopolymer having a mean average vinyl group content of 20–50% overall and a vinyl group content in said second block of about 10%, said block homopolymer being further characterized by:

(a) a number average molecular weight of $1.5 \cdot 10^5$–$5.5 \cdot 10^5$;
(b) a Defo elasticity of 25–50; and
(c) Mooney viscosity ML–4 at 100° C. of 10–120.

9. A block homopolymer according to Claim 7 wherein said first block has a vinyl group content of about 30% of the total vinyl group content in said polymer, said second block has a vinyl group content of about 70%, and the weight ratio of said first block to said second block is about 1:2.

10. A block homopolymer according to Claim 8, having a mean average vinyl content of 30–45%.

11. A block homopolymer according to Claim 9 in combination with at least one filler or extending oil.

12. A vulcanized block homopolymer according to Claim 8.

References Cited

UNITED STATES PATENTS

| | | | |
|---|---|---|---|
| 3,288,872 | 11/1966 | House | 240—669 |
| 3,306,949 | 2/1967 | Mertzweiller | 260—94.2 M X |

OTHER REFERENCES

Elastomers from Catalysts of Alakil Metals, Forman, Polymer Chemistry of Synthetic Elastomers, pt. II, Interscience, vol. XXIII, September 1969, pp. 503–535.

JOSEPH L. SCHOFER, Primary Examiner

W. F. HAMROCK, Assistant Examiner

U.S. Cl. X.R.

260—94.2 R